April 19, 1927.  L. C. STUKENBORG ET AL  1,624,996
POWDER DUSTING MACHINE
Filed Aug. 13, 1923  4 Sheets-Sheet 3
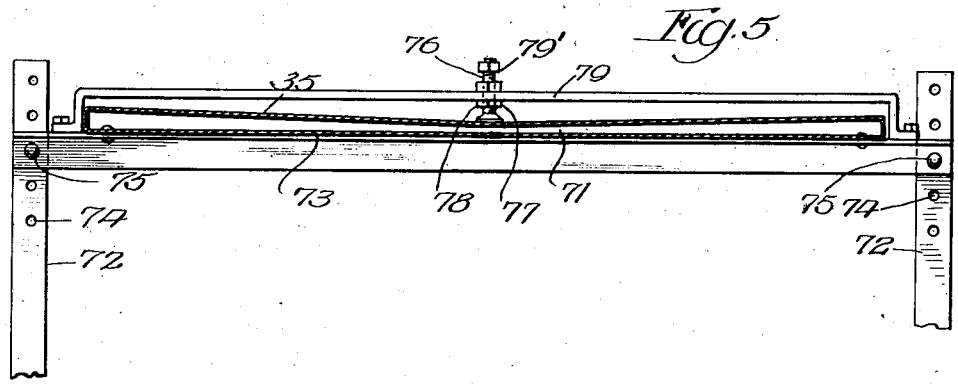
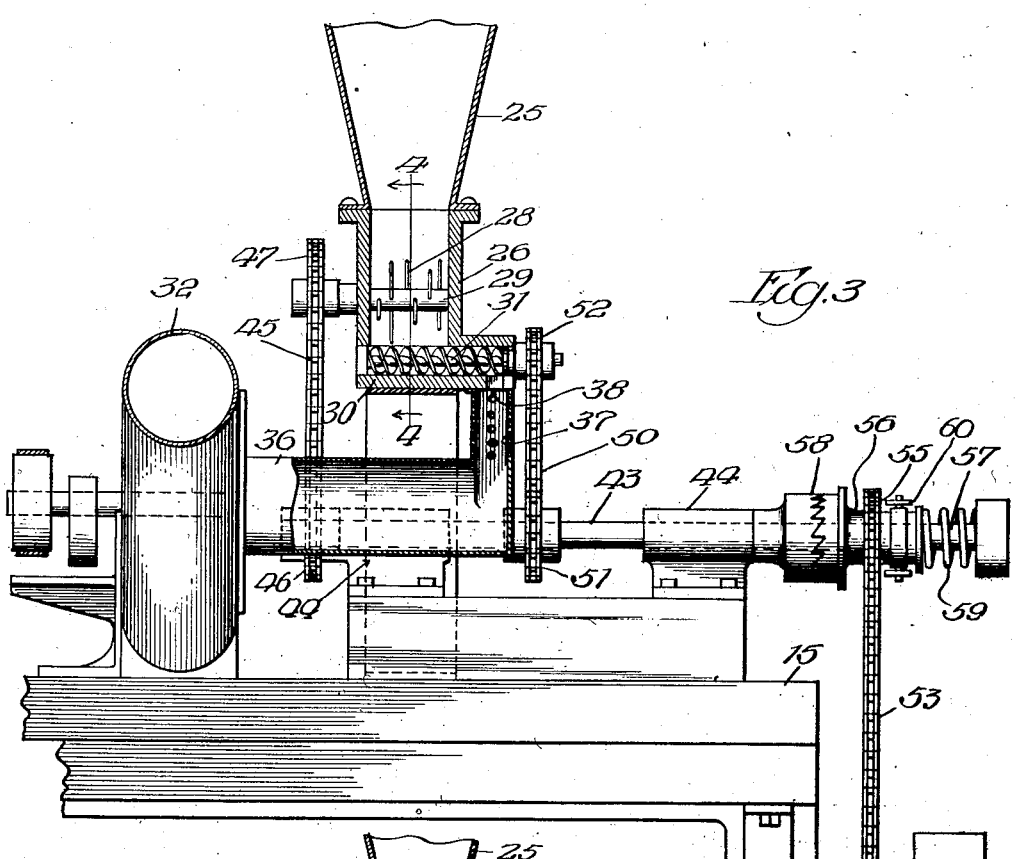
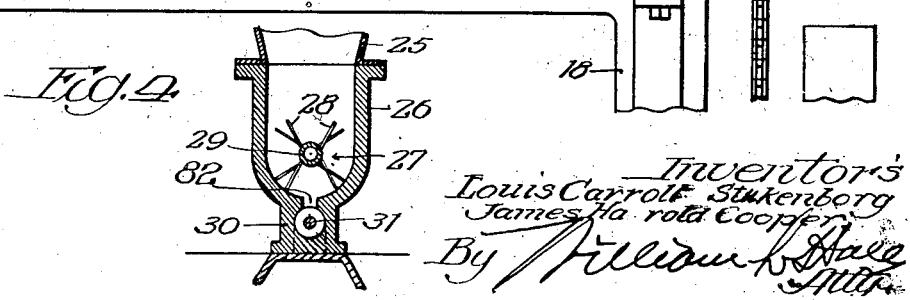
Inventors
Louis Carroll Stukenborg
James Harold Cooper
By William L. Hale
Attr.

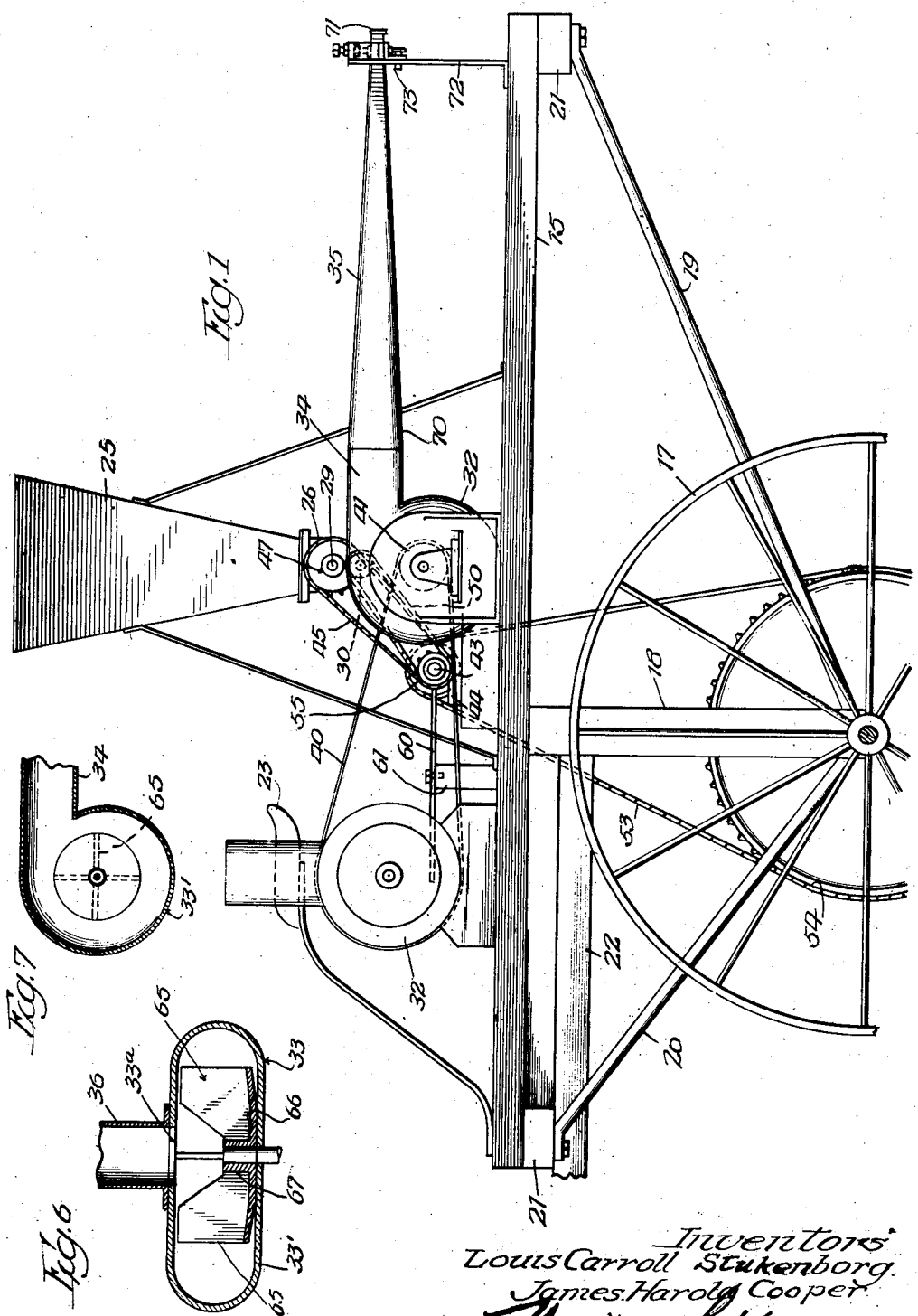

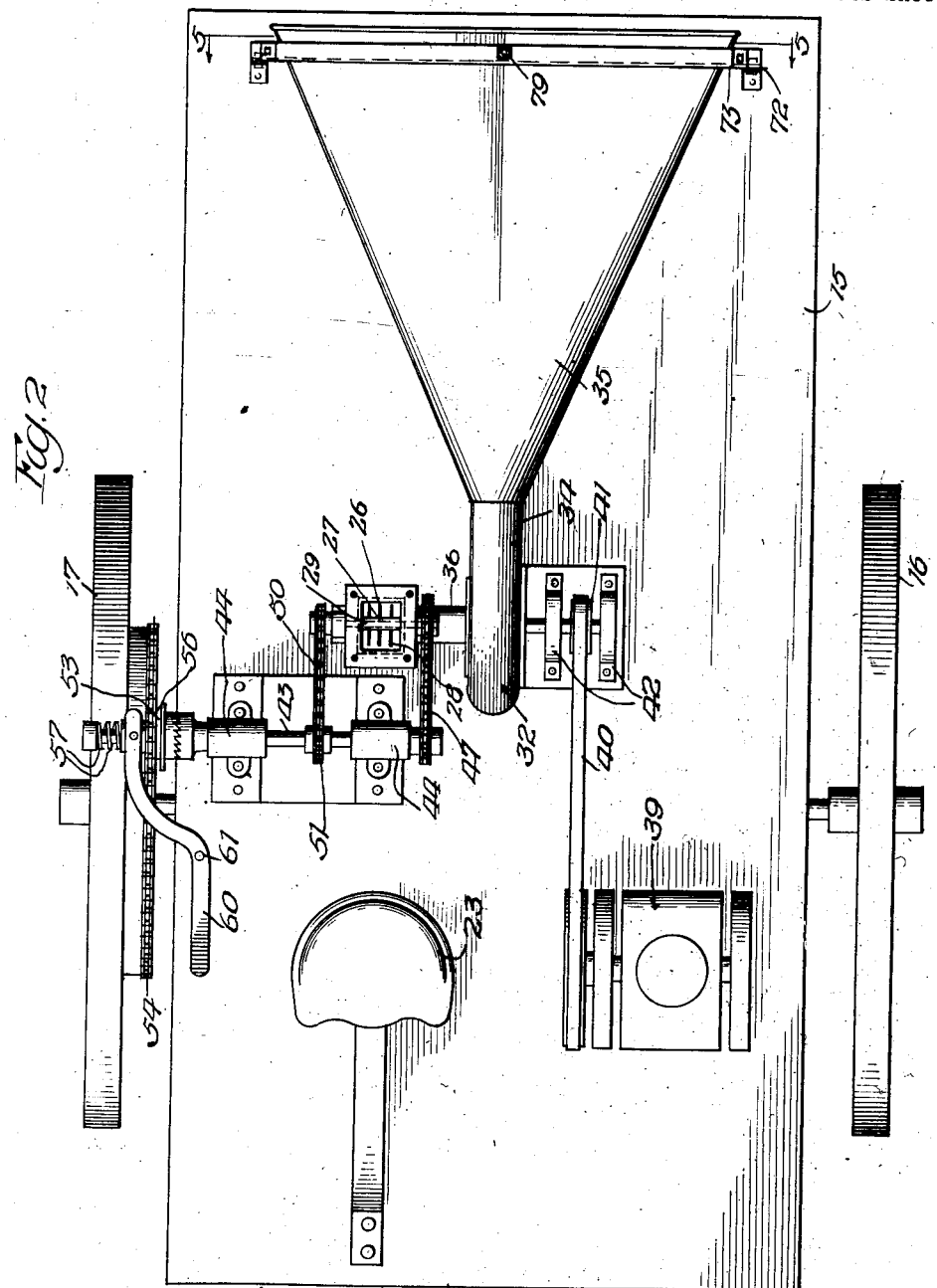

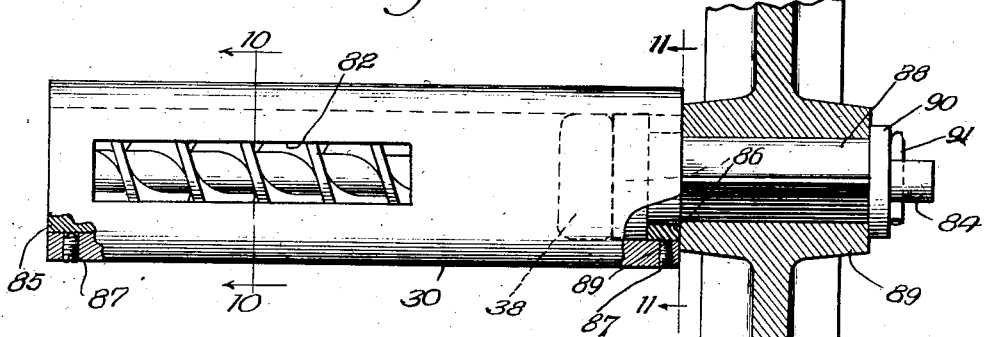
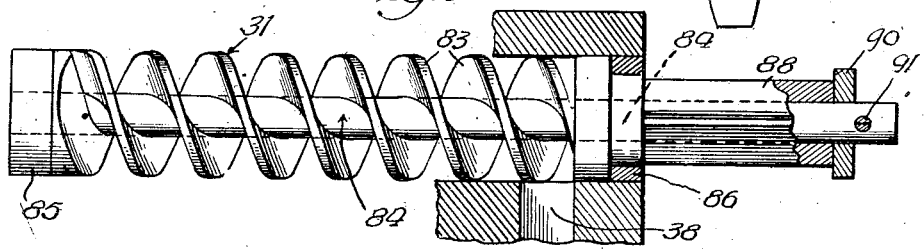
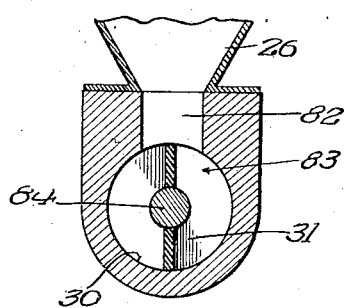
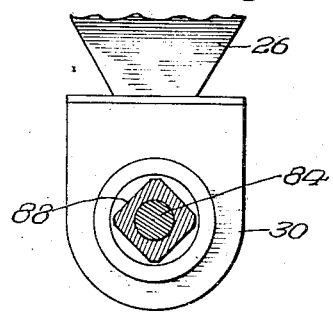

Patented Apr. 19, 1927.

1,624,996

UNITED STATES PATENT OFFICE.

LOUIS CARROLL STUKENBORG, OF MEMPHIS, TENNESSEE, AND JAMES HAROLD COOPER, OF LONOKE, ARKANSAS.

POWDER-DUSTING MACHINE.

Application filed August 13, 1923. Serial No. 657,167.

This invention relates to improvements in dusting apparatus for the purpose of applying a poisonous powder or insecticide to plants, vines or the like, to kill or check the growth of insects and other parasites which are injurious to the development of the plant, its fruit, or both.

The embodiment of the invention shown has been more particularly adapted for use as an apparatus for applying or dusting a poisonous powder such, for instance, as calcium arsenate, on cotton plants to kill or arrest the growth of boll weevil.

The invention herein disclosed is an improvement on the invention disclosed in the prior application of Louis Carroll Stukenborg, filed November 27th, 1922, Serial No. 603,648.

The object of the present invention is to further improve a dusting apparatus of this character by means to control the quantity of powder, which makes it possible to use a minimum quantity of the poisonous powder distributed over a given area, and thus economize in the use of the powder, and to equalize an even distribution of a predetermined quantity of the powder or substance over a given area, and also to minimize danger to the operator, especially when using such a poison powder as calcium arsenate.

The control of the quantity of powder also minimizes the danger of injuring soil fertility by an overcharge of poison, and injuring the cotton plant.

A further object of the invention is to produce, in combination with means for delivering the powder from a hopper to a blast fan, a novel non-clogging feed screw which is so constructed and arranged, as hereinafter described, as to keep the screw conveyor clean and avoid clogging of the powder on the feed and measuring screw.

A further object of the invention is to provide a novel combination of the means by which the powder, suitably agitated to keep it in a loosely pulverized condition, is delivered to the intake side of a blast fan by which the powder is projected through a suitable nozzle on the cotton plant, all arranged so that the feed of powder to the fan can be discharged through the nozzle and upon the plant in measured charges resembling a fine mist, to be applied to the plant at a time when the latter is moistened, preferably dew moistened.

Another object of the invention is to provide a novel form of fan nozzle so arranged that its outlet can be adjusted so as to project the powder evenly throughout its length of discharge orifice.

Another object of the invention is to produce in a machine of this character means whereby the feed of the powder to the measuring device, and the operation of the measuring device is controlled through connection of said parts with one of the traction wheels, so that the amount of powder feed will be proportioned to the speed of travel of the machine, in combination with an independently operable blast fan for projecting the powder on the plant.

A further object of the invention is to provide, in combination with a blast fan and the means for feeding the powder thereto, a novel arrangement of the fan blades which operate, after the powder is delivered to the fan, to further break up and reduce the mesh of the powder.

Other objects of the invention are to further improve and simplify machines of this general character and to provide a simple vehicle to carry the same, and the invention consists in the combination and arrangement of the parts shown in the drawings and described in the specification, and is pointed out in the appended claims.

In the drawings illustrating one embodiment of our invention:

Figure 1 is a side view of the machine.
Figure 2 is a plan view thereof.
Figure 3 is a part vertical section and elevation showing the powder hopper crushing device and the measured feed device in section.

Figure 4 is a fragmentary section taken on the line 4—4 of Figure 3.

Figure 5 is a section on the line 5—5 of Figure 2.

Figure 6 is a section of the blast fan in the plane of the axis of rotation of the blades.

Figure 7 is a section of said fan taken in a plane at a right angle to that shown in Figure 6.

Figure 8 is a partial plan and a partial section of the non-clogging feed and measuring device.

Figure 9 is an elevation of the conveyor of the non-clogging feed and measuring device showing fragments of its mounting.

Figure 10 is a cross section on the line 10—10 of Figure 8.

Figure 11 is a cross section on the line 11—11 of Figure 8.

We will first describe the construction of the machine and its elements, and thereafter set forth the operation of the machine and the advantages accruing from said construction.

The mechanism of the dusting machine is herein shown as mounted on a simple form of vehicle consisting of a platform 15, supported on traction wheels 16, 17, which are rotatively mounted on an axle that is carried by the lower ends of standards 18, which depend from and are fixed to the platform 15, and are braced from the ends of the platform by brace members 19, 20, connected to cross back and front sills 21, 21. The machine shown is a horse drawn machine and is provided with a tongue 22 and with a driver seat 23.

The powder to be distributed is stored in a hopper 25 which is suitably supported on the platform 15 and discharges in a crushing compartment 26 just below the discharge end of the hopper, and 27 is an agitator which comprises a plurality of pins 28 projected from a shaft 29 that is rotatively mounted in bearings carried by opposite walls of said compartment.

Located below said agitator compartment is a feed chamber 30 whose axis, as herein shown, is parallel to the axis of the agitator shaft 29. Within said feed chamber is a spiral feed screw designated as a whole by 31 in Figures 3, 4, 9 and 11 and illustrated more in detail in Figures 8, 9 and 10, to be hereinafter described. 32 designates a blast fan suitably mounted on the platform 15 at one side of the hopper, crushing chamber and feed chamber. It has a tangential outlet 34 which is connected to a spray or distributing nozzle 35, hereinafter to be more fully described. The fan has a central intake which is connected by the pipe 36 with a perforated conduit 37 that is below and connects with the feed chamber 30 through a gravity feed opening 38, best shown in Figure 3. Said fan is operated through a belt connection to a suitable motor 39, which may be an electric motor, gas motor, or the like, the belt 40 of said motor being trained over a pully on the motor shaft, and a smaller pulley 41 on the fan shaft, which latter is mounted in suitable bearings 42.

43 designates a counter shaft which is mounted in suitable bearings 44, 44, supported on the platform 15, and is shown as located below the non-clogging feed screw 31 and between it and the driver seat. Said countershaft is connected by a sprocket belt 45 with a sprocket pulley 46 on said countershaft and to a sprocket pulley 47 which is fixed to and rotates with the agitator shaft 29. The countershaft is also connected by a sprocket belt 50 through a sprocket pulley 51 on said shaft, and a sprocket pulley 52 on the rotative part of the feed screw 31, the construction of which latter is hereinafter described.

The countershaft 43 is driven from the traction wheel 17 through the medium of a sprocket or other drive chain 53 which is trained about a sprocket ring 54 mounted concentrically on and turning with the traction wheel 17, and a smaller sprocket wheel 55 that is fixed to a sleeve 56 that is slidable on an extension 57 of the countershaft, and is adapted to be locked to and released from said countershaft through the medium of a clutch, designated as a whole by 58, comprising clutch members on an enlarged part of the sleeve 56, and an enlarged sleeved part on countershaft 43. A spring 59 normally holds the clutch elements in driving engagement, and said clutch elements are adapted to be forced apart by a clutch shifter lever 60, which is pivoted on a standard 61 rising from the platform and is loosely connected to the clutch element sleeve 56, laterally exterior to the sprocket wheel 55, as best shown in Figures 2 and 3.

From what has been said and without going into specific details of the mechanisms referred to, it will be noted that the agitator 27 and the feed screw 31 are operated directly from the countershaft 43 which, in turn, is driven from one of the tractor wheels 17, as before described, and that the blast fan or blower is driven from separate power through the motor 39. Therefore, the amount of powder fed to the central intake of the fan will depend upon the speed of travel of the machine and the gear ratios between the sprocket ring 54 and the gears connecting the sprocket chain 53 to the countershaft and the countershaft to the working elements of the agitator and the feed screw.

The theory of delivering the powder centrally to the fan 33, and discharging it through the tangenial outlet 34 is the same as in the construction shown in the aforesaid prior Stukenborg application in that the powder will be thus further broken up in its passage through the fan to the nozzle 35. In the present construction, however, and as most clearly shown in Figures 6 and 7, the fan is of special construction. It embraces, in addition to its casing 33$^1$, a series of blades 65, which are made integral with a solid back plate 66 which has a central hub 67 that is fixed to the fan shaft and is located on the side of the casing 33¹ remote from the central intake 33ª of said fan casing. The said blades 65 are directed towards the side of the casing in which is formed the central intake, and to which is connected the tube 36, and are free at their side edges adjacent to the wall in which is formed said central intake; and the edges of said blades adjacent to their turning axis are inclined from the hub 67 outwardly so as to provide a free inlet for the powder to the fan casing,—the opposite edges of the blades being, preferably, generally parallel to the axis of rotation of its blades. The spiral of the blades may be made to suit the convenience of the designer and as found best in practice. The function of back plate 69 is two fold. First, it serves as an impact element which suddenly arrests the particles of dust by direct action and crushes them due to impact; and this pulverizing action is improved by reason of the fact that the impact element is rotating so that when struck by particles or lumps in the powder by direct impact, there are two forces which serve to break up the powder, one a direct impact force and the other a swiping force acting at an angle thereto, due to the rapid rotation of the back plate. Second, the back plate serves as a moving shield to prevent accumulation of the powder on the fan casing back wall which would occur if the moving fan structure were open entirely through to the back wall. This latter condition would set up a compacting of the powder against the fixed or stationary back wall with the result of obstructing the flow of powder through the fan producing an irregular outlet flow therefrom and setting up a condition which would ultimately stop the fan. These conditions of pulverizing and maintaining the powder in a free state of suspension so that it will be directed uniformly to and through the outlet of the fan are further assisted by the swirl set up by the usual blade action of the fan. The extent of this swiping force will depend upon the distance from the center of back plate at which the powder strikes said plate; and this can be controlled by the velocity of air and powder flow through the fan and the radial rotation of back plate center to the fan intake.

The discharge nozzle 35 is of fan shape as viewed from above. It is formed with an intake end 70 which is, preferably, detachably and telescopically secured to the outlet 34 of the fan. The said nozzle spreads in both directions from the axis of its smaller end, as shown in Figure 2, and is made gradually shollower towards its discharge orifice 71 which, as herein shown, extends horizontally principally across the rear end of the platform or frame 15. Preferably, the nozzle is of decreasing depth from its inner to its outer end, as shown in Figure 1, so that the discharge orifice 71 becomes a rather narrow slit, as indicated in Figures 1 and 5. The nozzle is supported on a bracket rising from the rear end of the platform or frame 15, said bracket including upright standards 72, 72 and a cross bar 73. The orifice end of the nozzle extends slightly beyond the cross bar 73 and can be riveted or otherwise fixed thereto, as shown in Figure 5. The joint between the inner end 70 of said nozzle and the fan outlet 34 is such as to permit a substantial vertical adjustment of the outer or rear end of the nozzle. This adjustment may be afforded by providing the standards 72 with openings 74, and detachably fixing the angle bar 73, which is L shaped in cross section, to said standards by bolts 75 extending through the openings in the vertical flange of the cross bar 73 and openings 74 at different elevations on the standards 72.

In addition to the vertical adjustment of the rear end of the nozzle, means are provided for varying the outlet area of the orifice 71, with respect to its central and end portions. The tendency of the fan or blower, if the orifice were made of the same area throughout its length, would be to discharge a larger portion of the powder through the central part of the orifice. The adjustment referred to is effected by means which depress the top wall of the orifice. It is best shown in Figure 5, wherein such deformation of the orifice is effected by a threaded stud 76 which extends through a cross bar 79 which extends across and over the orifice end of the fan-shaped nozzle or distributor 35 and is fixed at its ends to the machine. The stud is provided below the cross bar 79 with a lock nut 77 and above said bar with a lock nut 78. The lower end of said stud may be flared to give larger area of pressure against the top wall of the nozzle, and said stud may be surmounted by a head 79'. The lower wall of the nozzle rests flat on the angle bar 73 and the total deformation of the orifice is effected by down pressure on the upper wall thereof.

The particular form of powder feed and measuring screw 31, herein shown, and the chamber in which it operates, are best illustrated in detail in Figures 8 to 11, inclusive, and are made as follows:

83 designates the tubular spirals of the feed screw (designated as a whole in Figures 3 and 9 by 31) which are rotative on an axis in a cylindric feed chamber formed in the part 30 before mentioned, and which chamber is in open communication with the agitating chamber 26 through a slitted opening 82. The said spiral feed screw and its mounting is of peculiar construction. The structure which carries the spirals 83 is formed as part of a hollow casing 88 which is journaled on a fixed shaft 84 that lies axially in the chamber 30. Said shaft is rotationally fixed and centered in said chamber by means of centering disks 85, 86, which are of diameters to fit closely in the ends of the feed cylinder, as best shown in Figures 8 and 9. The disc 85 is fixed to the shaft and both centering disks are fixed to the wall of the feed cylinder by means of set screws 87 threaded through openings in said wall and impinging on the peripheries of the disks. One end of the screw or that which extends beyond the centering disk 86 is made polysided at 88 to fit within a corresponding internal fashioned hub 89 of the sprocket wheel 52, whereby said spiral feed screw element is rotated through the connection of the sprocket chain 50 with the countershaft 43. The said sprocket wheel 52 is fastened on the polysided end 88 of the feed screw member by means of a washer 90 fitted over the adjacent reduced end of the shaft and held in place by a cotter or like pin 91, as best shown in Figures 8 and 9. The feed spirals 83 of the feed screw are held from endwise displacement in the feed chamber 30.

It will be observed by inspection of Figures 8 and 9, that the feed spirals 83 are formed on a solid body constituted by the spiral formation, and with the bases of the spirals extending entirely to the supporting shaft 84. Therefore, the spaces between the bases of the spirals are open for free contact of the powder with the shaft 84. Relative movement of the spirals, therefore, to the shaft 84, as by journaling the spiral structure on the fixed shaft 84, as herein shown and described, has two effects,—first, principally to prevent clogging of the powder between the spirals inasmuch as the bearings of the sharp edges of the bases of the spirals against the shaft self-cleans the shaft; and second, to constitute means to further reduce the mesh of the powder which is being fed forwardly by the spirals.

Powders which are usually used as insecticides for boll weevil, such as calcium arsenate, compact or cake readily with any substantial water content. The construction of the conveyor or feed spirals in combination with the shaft shown prevents compacting of the powder between the spirals, and this feed action has the effect to insure a predetermined amount of powder fed to the intake of the fan. This amount will be controlled by the field conditions and varying amounts of the powder can be spread over the cotton plants simply by substituting gearing or conveyors having spirals of different leads. Preferably, however, the lead of the spirals is less than one-half the circumference thereof, which reduces possibility of the entrance of a substance which can not be delivered at the outlet of the feed chamber. While we have found the latter proportions to produce the best results, it is understood that the invention is not limited in this latter aspect to the ratios mentioned.

The cylindric feed chamber 30 is always kept full of powder from the chamber or hopper 26 through the opening or slit 82 and the pressure on the feed is always the same, which is regulated by the speed of the agitators 28, 29. The weight of the powder or substance in the hopper 25 has little to do with the pressure of the powder or substance on the feed spirals, but the speed of the spiral feed element governs the amount of powder or substance delivered to the fan. In other words, what enters the mouth or receiving end of the feed cylinder must be delivered at the discharge end in the same quantity and with positive regularity.

In the operation of the machine, the powder to be distributed is placed in the hopper 25, and from thence drops by gravity to the agitating chamber 26 in which the agitator elements 28, 29 are mounted to reduce lumps in the powder. From thence the powder of reduced mesh falls by gravity through the slitted opening 82 into the feed chamber 30 upon and around the feed spirals 83 and the mounting shaft 84. As before stated, the said agitating elements 28, 29, and the feed spirals are rotated at a given speed, although not necessarily the same, through their geared connections to the tractor wheel; and this speed of the agitating and feed elements is varied by the speed of travel of the machine over the ground, and by the gear ratio from the sprocket ring on the tractor wheel to the rotative crushing and feed elements. This gear ratio and the pitch of the feed spirals relatively to the diameter thereof, and to the inlet to and outlet from the feed cylinder, makes it possible to closely determine the amount of powder which will be fed to the fan for each advance lineal foot of travel of the machine, as a whole. The speed of the fan may be regulated as best suited to the field conditions, the area of the fan inlet and outlets, and the area of the spraying nozzle. The construction of the fan with its blading, comprising a solid back plate and blades extending therefrom towards the inlet opening of the fan, has the effect to cause the powder to strike against the solidly, rapidly rotating back plate by an impact and radial crushing effect due to the high rotational speed of said plate which will further reduce its mesh, and the powder is further reduced as it is carried outwardly by the blades to the outlet of the fan. It is desirable that the distance of the discharge from the feed cylinder to the central intake of the fan be sufficiently great that the powder shall become uniformly mixed with the air before it enters the fan, with the two-fold effect,—first, of preventing slugs of the powder entering the fan and passing out as such; and second, by the distribution of the powder well mixed with the air, effectuate the crushing of the powder particles by their impact against the back plate and their subsequent contact with the rapidly revolving blades.

It is important in the combination disclosed, therefore, that the powder be constantly delivered in measured quantities from the feed chamber to the fan, and the non-clogging construction of the feed screw insures such uniform and non-lumpy feed by reason of the fact that the contact of the powder with the shaft on which the feed spirals rotate, and the contact of the edges of said spirals with said shaft, which are in relative rotation, prevents clogging of the spiral feed screw and, therefore, insures discharging of the powder from the feed chamber to the conduit of the fan in non-lumpy and uniform mesh. While the shaft 84 on which the spirals of the feed screw rotate is herein shown as being fixed by the screws 87 and discs 85, 86, it is only necessary that there shall be a relative movement between said spirals and shaft, which can be attained by the fixed condition of the shaft, as herein shown, or by a differential speed of the shaft and spirals in the same direction or shaft movement opposite to the feed spirals. All of these constructions serve to effectuate non-clogging of the feed screw and the delivery of the powder in uniform mesh or non-lumpy form to the conduit leading to the central intake of the fan.

The use of the flared or fan-shaped discharge nozzle 35 is important, because the powder is delivered over a wide area, and by reason of the adjustment of the nozzle orifice, due to the adjusting screw 76 and its nuts 77 and 78, or other equivalent adjustment, the discharge of the powder through the nozzle may be uniformly thin, thus spreading the powder in uniform quantities over the full width of a given area to be covered. The flaring shape of the nozzle also is important, inasmuch as all turns, angles, frictions and obstructions are thereby reduced to gradually change the powder and air body from a round to a flat stream, and thus preserve a smooth surface and avoid drifts in the line of the discharging flow, so that the powder is discharged from the nozzle orifice at uniform velocity throughout, and, due to its previous treatment, as well as its commingling in the nozzle, a very perfect mixture of air and the powder is discharged on the plants. By reason of the gradual change from a round to a flat stream in said nozzle, the mixture of air and powder is caused to take on, so to speak, localized miniature cyclonic movements, so that the powder after it has been discharged from the nozzle will reach every part of the plant, and find lodgment on the stalks, branches, and on upper and lower parts of the foliage.

It will be obvious from what has been said, that the principles of the machine disclosed enable the powder to be economically distributed over a given area with the full result intended of killing or checking the growth of insects, such as boll weevils, thereby effecting a great saving in the quantity of powder used, and with the result also of reducing the danger of handling poisonous insecticides, destroying the fertility of the ground and destroying plant life.

Moreover, it will be observed that in executing the plan herein disclosed a very simple and economical machine can be produced, and one which can be operated by unskilled labor.

While we have set forth the construction and operation of a practical embodiment of the invention, it is to be understood that the disclosure and description are intended to be illustrative and not limiting, and that, therefore, the invention is not limited except as to claims where specific details are set forth, and as imposed by the prior art.

We claim as our invention:

1. A powder dusting machine comprising a frame and supporting and traction wheels therefor, a receptacle for powder on the frame, a fan having an intake provided with an inlet conduit and an outlet terminating in a distributing nozzle, a powder feed and measuring device to receive powder from said hopper and to deliver it by gravity into said conduit, driving connections between a traction wheel and the feed means, and a motor carried by said frame for separately driving said fan.

2. A powder dusting machine comprising a frame and its supporting and traction wheels, a self cleaning measured feed mechanism through which powder is passed, a fan having an intake and an outlet terminating in a spraying nozzle, a countershaft mounted on said frame and having driving connection to the measured feed mechanism, a driving connection between said countershaft and one of the traction wheels, and a motor carried by the frame for separately driving said fan.

3. A powder dusting machine comprising a frame and its supporting and traction wheels, a self cleaning measured feed mechanism through which powder is passed, a fan having an intake and an outlet terminating in a spraying nozzle, a countershaft rotatively mounted on said frame and having driving connection to the measured feed mechanism, a driving connection between said countershaft and one of the traction wheels, a motor carried by the frame for separately driving said fan, and a clutch for cutting off power between said traction wheel and said countershaft.

4. A powder dusting machine comprising in combination a hopper, a feed chamber to receive powder from hopper, and itself provided with an outlet, a fan having an intake and an outlet terminating in a discharge nozzle, and a feed measuring device operating in said chamber embracing a fixed shaft, and a tubular, exteriorly spiraled conveyor journaled thereon and constructed to expose said shaft at the roots of the spirals with means to rotate said conveyor, said spiral member carrying the powder to the outlet end of said chamber to allow it to drop by gravity to a connection to the intake of the fan.

5. In a powder dusting machine a discharge nozzle comprising a rounded connection for a fan outlet, said nozzle flaring outwardly to produce a flattened nozzle having an elongated flat orifice symmetrical with its rounded part, and means to vary the orificial area of said orifice.

6. In a powder dusting machine a discharge nozzle comprising a rounded connection for a fan outlet, said nozzle flaring outwardly to produce a flattened nozzle having an elongated flat orifice symmetrical with its rounded part, and means to compress the walls of the nozzle together at the intermediate ends of the orifice.

7. In combination with a blast fan having an inlet and an outlet, of a powder feed chamber, a conduit affording communication from said chamber to said intake, and a spiral feed device embracing a rotative spiral in said feed chamber and a shaft on which it is journaled, said shaft being exposed to the powder between the spirals of said feed device.

In witness whereof we claim the foregoing as our joint invention, we hereunto append our signatures this 11th day of July, 1923.

LOUIS CARROLL STUKENBORG.
JAMES HAROLD COOPER.